(12) United States Patent
Ishii et al.

(10) Patent No.: US 8,797,882 B2
(45) Date of Patent: Aug. 5, 2014

(54) MOBILE STATION, RADIO BASE STATION, AND MOBILE COMMUNICATION METHOD FOR DETERMINING A RADIO LINK FAILURE IN BOTH A DISCONTINUOUS STATE AND A NON-DISCONTINUOUS STATE

(75) Inventors: Hiroyuki Ishii, Yokosuka (JP); Mikio Iwamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 229 days.

(21) Appl. No.: 13/120,352

(22) PCT Filed: Sep. 17, 2009

(86) PCT No.: PCT/JP2009/066225
§ 371 (c)(1),
(2), (4) Date: May 19, 2011

(87) PCT Pub. No.: WO2010/032775
PCT Pub. Date: Mar. 25, 2010

(65) Prior Publication Data
US 2011/0211458 A1     Sep. 1, 2011

(30) Foreign Application Priority Data

Sep. 22, 2008  (JP) ................................ P2008-243400

(51) Int. Cl.
*G01R 31/08*  (2006.01)
*G06F 11/00*  (2006.01)
*G08C 15/00*  (2006.01)
*H04J 1/16*  (2006.01)
*H04J 3/14*  (2006.01)
*H04L 1/00*  (2006.01)
*H04L 12/26*  (2006.01)

(52) U.S. Cl.
USPC ............ 370/242; 370/248; 370/252; 370/311

(58) Field of Classification Search
USPC ......... 370/206, 208, 242, 247, 248, 251, 252, 370/310.2, 311, 324, 328, 331, 332; 455/436, 437, 438, 443, 456.4, 456.5
See application file for complete search history.

(56) References Cited

U.S. PATENT DOCUMENTS

| | | |
|---|---|---|
| 2008/0019279 A1 * | 1/2008 | Kim et al. ...................... 370/241 |
| 2008/0074994 A1 * | 3/2008 | Jen ................................ 370/218 |
| 2008/0130488 A1 | 6/2008 | Kuo |
| 2009/0296643 A1 * | 12/2009 | Cave et al. .................... 370/329 |
| 2011/0211458 A1 * | 9/2011 | Ishii et al. ..................... 370/242 |

OTHER PUBLICATIONS

International Search Report w/translation from PCT/JP2009/066225 dated Dec. 15, 2009 (4 pages).

(Continued)

*Primary Examiner* — Benjamin H Elliott, IV
(74) *Attorney, Agent, or Firm* — Osha Liang LLP (57) ABSTRACT

In a mobile station (UE) according to the present invention, a radio link failure state determination unit determines whether or not the mobile station (UE) is in a radio link failure state, based on a downlink synchronization state and a discontinuous reception state parameter, when the mobile station (UE) is in a discontinuous reception state. The radio link failure state determination unit determines whether or not the mobile station (UE) is in the radio link failure state, based on the downlink synchronization state and a non-discontinuous reception state parameter, when the mobile station (UE) is not in the discontinuous reception state.

7 Claims, 9 Drawing Sheets

(56) References Cited

OTHER PUBLICATIONS

Written Opinion from PCT/JP2009/066225 dated Dec. 15, 2009 (4 pages).
3GPP TSG-RAN3 Meeting #56, R2-063171; "Radio Link Failure Handling in LTE"; Samsung et al.; Riga, Latvia; Nov. 6-10, 2006 (4 pages).
3GPP TS 36.331 V8.2.0; "3rd Generation Partnership Project; Technical Specification Group Radio Access Network; Evolved Universal Terrestrial Radio Access (E-UTRA) Radio Resource Control (RRC); Protocol Specification (Release 8)"; May 2008 (151 pages).
3GPP TSG RAN WG2 #56bis, R2-070088; "Summary of Email Discussion on DRX in LTE_ACTIVE"; Panasonic; Sorrento, Italy; Jan. 15-19, 2007 (4 pages).
3GPP TSG RAN WG2 #64, R2-086746; "RLF Detection"; NTT DOCOMO Inc.; Prague, Czech Republic; Nov. 10-14, 2008 (1 page).
3GPP TSG-RAN WG4 Meerting #48bis, R4-082657; "Radio Link Monitoring Requirements"; Ericsoon; Edingurgh, Scotland, UK; Sep. 29-Oct. 3, 2008 (3 pages).
3GPP TS 36.321 V8.2.0; "3rd Generation Partnership Project; Technical Specification Group Radio Access Network; Evolved Universal Terrestrial Radio Access (E-UTRA) Medium Access Control (MAC) Protocol Specification (Release 8)"; May 2008 (33 pages).
3GPP TS 36.213 V8.3.0; "3rd Generation Partnership Project; Technical Specification Group Radio Access Network; Evolved Universal Terrestrial Radio Access (E-UTRA); Physical Layer Procedures (Release 8)" (45 pages).
3GPP TS 25.331 V8.2.0; "Universal Mobile Telecommunications System (UMTS); Radio Resource Control (RRC); Protocol Specification (Release 8)"; Mar. 2008 (1489 pages).
3GPP TS 25.214 V8.1.0; "3rd Generation Partnership Project; Technical Specification Group Radio Access Network; Physical Layer Procedures (FDD) (Release 8)"; Mar. 2008 (87 pages).
Office Action in corresponding Chinese application No. 200980137007.5 dated Apr. 2, 2013 (10 pages).
Chinese Office Action issued in Chinese Patent Application No. 200980137007.5, mailing date Dec. 9, 2013, with English translation thereof (10 pages).

* cited by examiner

| | $N313_1$ | T313 | $N315_2$ |
|---|---|---|---|
| DISCONTINUOUS RECEPTION PARAMETER | 5 | 3 SEC. | 1 |
| NON-DISCONTINUOUS RECEPTION PARAMETER | 20 | 5 SEC. | 2 |

MOBILE STATION, RADIO BASE STATION, AND MOBILE COMMUNICATION METHOD FOR DETERMINING A RADIO LINK FAILURE IN BOTH A DISCONTINUOUS STATE AND A NON-DISCONTINUOUS STATE

TECHNICAL FIELD

The present invention relates to a mobile station, a radio base station, and a mobile communication method.

BACKGROUND ART

In general, a mobile communication system is configured to monitor a synchronization state between a radio base station and a mobile station. For example, in a mobile communication system of the WCDMA scheme, the following two indexes are defined to determine the downlink synchronization state of a physical layer.

DPCCH (Dedicated Physical Control Channel) quality

CRC (Cyclic Redundancy Check) result

Here, the DPCCH quality corresponds to a reception quality of pilot symbols or transmission power control (TPC) bits, for example, an SIR (signal-to-interference power ratio) or a reception level, and the CRC result corresponds to a block error rate.

A determination interval used to determine the downlink synchronization state of the physical layer described above is, for example, 160 ms. As described below, the determination for the radio link failure (RLF) state of the RRC layer is performed based on the determination result of the downlink synchronization state of every 10 ms.

That is, in the mobile communication system of the WCDMA scheme, the determination for the radio link failure state of the RRC layer based on the downlink synchronization state reported from the above-described physical layer is defined and the operation of the mobile station UE in the radio link failure state is also defined.

Figure 14:
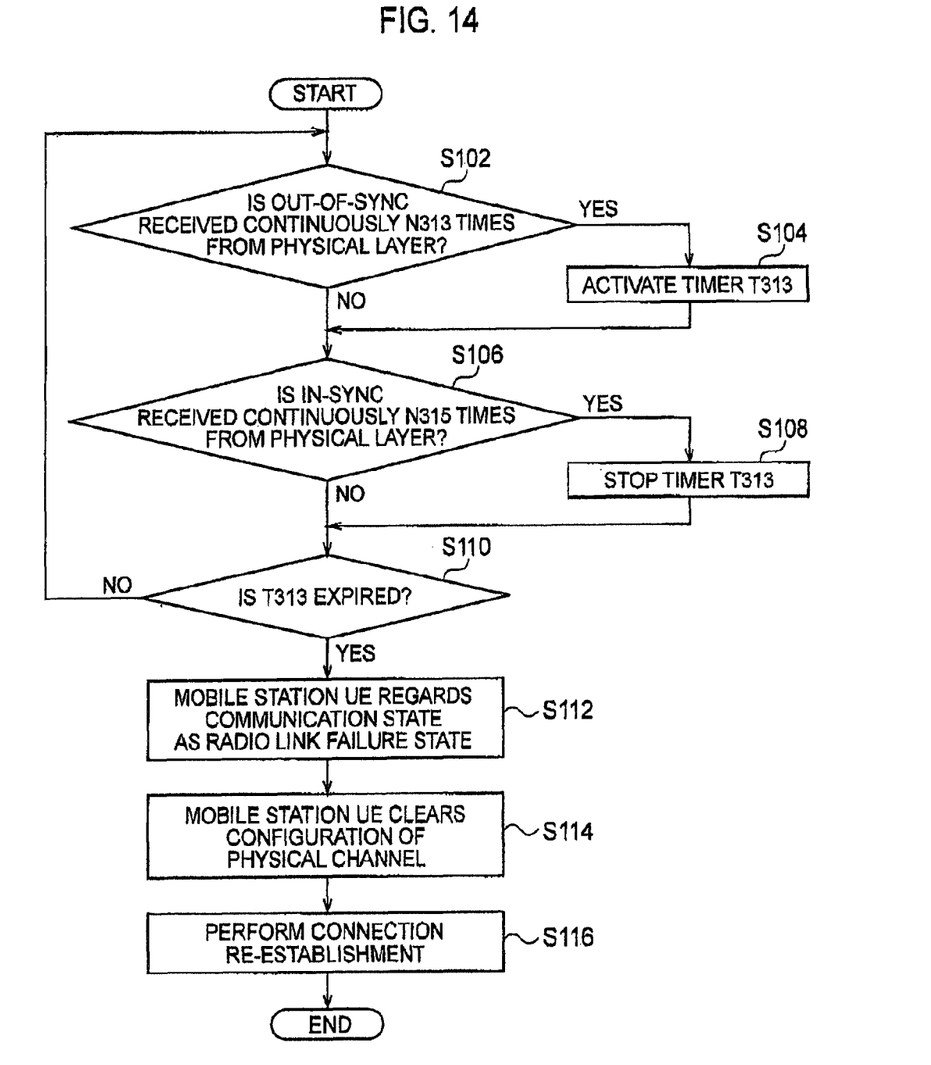
FIG. 14 is a flowchart showing the operation of an ordinary mobile station.

The determination for the radio link failure state of the RRC layer described above and the operation of the mobile station UE in the radio link failure state will be described with reference to FIG. 14.

When continuously receiving the report of "Out-of-sync", that is, "synchronization state: NG" N313 times from the physical layer in step S102 (YES in S102), the mobile station UE starts a timer T313 (S104). Steps S102 and S104 may be performed only when the timer T313 is not activated.

On the other hand, when continuously receiving the report of "In-sync", that is, "synchronization state: OK" N315 times from the physical layer in step S106 (YES in S106), the mobile state UE stops the timer T313 (S108). Steps S106 and S108 may be performed only when the timer T313 is activated.

When the T313 expires (YES in step S110), the process proceeds to step S112. When the T313 does not expire (NO in step S110), the process returns to step S102. Step S110 may be performed both when the T313 is activated and when the T313 is not activated.

Steps S102 to S110 may be always performed when a radio base station eNB and the mobile station UE are in a connection state. Alternatively, steps S102 to S110 may be performed every 10 ms when the radio base station eNB and the mobile station UE are in the connection state. Here, 10 ms indicates one radio frame. In addition, the connection state may be an RRC_Connected state.

In step S112, the mobile station UE regards the communication state between the radio base station eNB and the mobile station UE as a radio link failure state.

The radio link failure state may be called an RLF (radio link failure) state and refers to a state in which a communication quality between the radio base station eNB and the mobile station UE considerably deteriorates and thus communication is not possible.

In step S114, the mobile station UE clears the communication configuration between the radio base station eNB and the mobile station UE.

In step S116, the mobile station UE performs connection re-establishment processing. Here, the connection re-establishment processing may be called "Cell Update processing". The mobile station UE may perform the above-described connection re-establishment processing, when there is no processing being performed or when an operation in the radio link failure state is not defined in the processing being performed.

In such a case, the mobile station UE performs the operation in the radio link failure state during the processing being performed, when there is processing being performed and when the operation in the radio link failure state is defined in the processing being performed.

Here, the parameters such as T313, N315, and N313 described above correspond to a hysteresis or the number of protection steps and are used to determine the radio link failure state with high accuracy and at an appropriate timing.

However, the mobile communication system adopts discontinuous reception (DRX) control, in order to reduce the power consumption of the mobile station UE, that is, for battery saving purpose.

For example, in a mobile communication system of the LTE (long term evolution) scheme which is the next generation of the WCDMA scheme, the discontinuous reception control is performed, while the radio base station eNB and the mobile station UE are connected to each other and when there is no data to be communicated, and the mobile station UE in the discontinuous reception state is configured to receive a downlink control signal transmitted via a physical downlink control channel (PDCCH) periodically, that is, discontinuously.

In such a case, since the mobile station UE has only to receive the downlink control signal transmitted via the physical downlink control channel (PDCCH) discontinuously, instead of all timings, the power consumption of the battery can be reduced.

Figure 15:
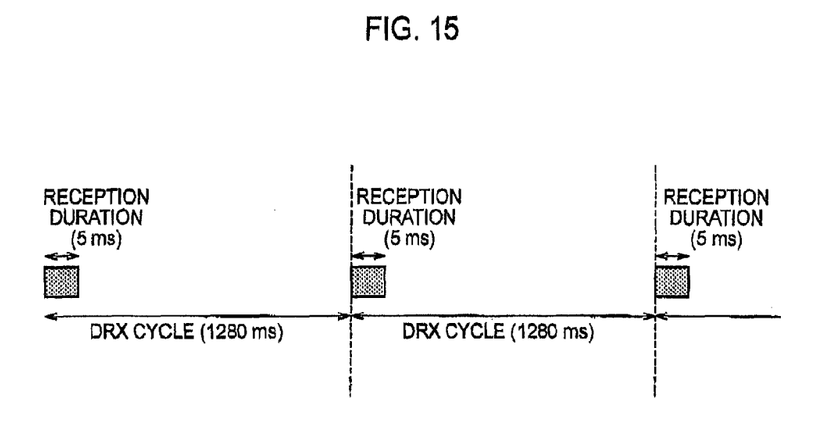
FIG. 15 is a diagram explaining a discontinuous reception in the ordinary mobile station.

In more detail, as shown in FIG. 15, the mobile station UE is configured to receive the downlink control signal transmitted via the physical downlink control channel (PDCCH) only at the reception duration (5 ms in the example of FIG. 15) set in each DRX cycle (1280 ms in the example of FIG. 15) and other transceivers are configured to be turned off. As a consequence, the power consumption of the battery of the mobile station UE can be reduced. The reception duration may be called On-duration.

SUMMARY OF THE INVENTION

Problems to be Solved by the Invention

As described above, the radio link failure state of the RRC layer is determined with high accuracy and at an appropriate timing by the parameter corresponding to the hysteresis or the number of protection steps.

On the other hand, as described above, the mobile communication system performs the discontinuous reception control, while the radio base station eNB and the mobile station UE are being connected to each other. That is, the state of each mobile station UE includes two types of states a discontinuous reception state and a non-discontinuous reception state according to the presence or absence of data to be communicated.

Here, the mobile station UE in the discontinuous reception state is generally configured to determine the downlink synchronization state described above only at the reception duration in the discontinuous reception control, in order to maintain the battery saving effect by the discontinuous reception control.

That is, in the non-discontinuous reception state, the downlink synchronization state is notified from the physical layer to the RRC layer very frequently, for example, every 10 ms. Meanwhile, in the discontinuous reception state, the downlink synchronization state is notified only at the reception duration in the discontinuous reception control.

As a consequence, it may not possible to set the parameter corresponding to the hysteresis or the number of protection steps optimal for both the discontinuous reception state and the non-discontinuous reception state.

Therefore, the present invention is intended to overcome the above-described problem. An object of the present invention is to provide a mobile station, a radio base station, and a mobile communication method capable of appropriately determining a radio link failure state for both a discontinuous reception state and a non-discontinuous reception state.

Means for Solving the Problem

A first aspect of the present invention is summarized as a mobile station communicating with a radio base station, including: a parameter acquisition unit configured to acquire a discontinuous reception state parameter and a non-discontinuous reception state parameter from the radio base station; a synchronization state determination unit configured to determine a downlink synchronization state, based on a radio quality of a serving cell for the mobile station; a radio link failure state determination unit configured to determine whether or not the mobile station is in a radio link failure state, based on a determination result by the synchronization state determination unit; and a connection re-establishment unit configured to re-establish a connection with the radio base station, when the radio link failure state determination unit determines that the mobile station is in the radio link failure state, wherein the radio link failure state determination unit determines whether or not the mobile station is in the radio link failure state, based on the downlink synchronization state determined by the synchronization state determination unit and the discontinuous reception state parameter acquired by the parameter acquisition unit, when the mobile station is in a discontinuous reception state; and the radio link failure state determination unit determines whether or not the mobile station is in the radio link failure state, based on the downlink synchronization state determined by the synchronization state determination unit and the non-discontinuous reception state parameter acquired by the parameter acquisition unit, when the mobile station is not in the discontinuous reception state.

In the first aspect of the present invention, the radio link failure state determination unit can be configured to activate a timer, when an asynchronous state of the downlink synchronization state continues for a first predetermined period or more, and to determine that the mobile station is in the radio link failure state at a time at which the timer expires; and the discontinuous reception state parameter and the non-discontinuous reception state parameter can include at least one of a first parameter for defining the first predetermined period and a second parameter for defining the timer.

In the first aspect of the present invention, the radio link failure state determination unit can be configured to stop the timer, when the synchronous state of the downlink synchronization state continues for a second predetermined period or more in a state where the timer activates; and the discontinuous reception state parameter and the non-discontinuous reception state parameter can include a third parameter for defining the second predetermined period.

A second aspect of the present invention is summarized as a radio base station communicating with a mobile station, including: a parameter notification unit configured to notify, to the mobile station, a discontinuous reception state parameter and a non-discontinuous reception state parameter; wherein it is determined whether or not the mobile station in a discontinuous reception state is in a radio link failure state based on the discontinuous reception state parameter and a downlink synchronization state; and it is determined whether or not the mobile station in a non-discontinuous reception state is in the radio link failure state based on the non-discontinuous reception state parameter and the downlink synchronization state.

In the second aspect of the present invention, a timer can be configured to be activated in the mobile station, when an asynchronous state of the downlink synchronization state continues for a first predetermined period or more, and it can be determined that the mobile station is in the radio link failure state at a time at which the timer expires; and the discontinuous reception state parameter and the non-discontinuous reception state parameter can include at least one of a first parameter for defining the first predetermined period and a second parameter for defining the timer.

In the second aspect of the present invention, the timer can be configured to be stopped in the mobile station, when the synchronous state of the downlink synchronization state continues for a second predetermined period or more in a state where the timer activates; and the discontinuous reception state parameter and the non-discontinuous reception state parameter can include a third parameter for defining the second predetermined period.

A third aspect of the present invention is summarized as a mobile communication method of performing communication between a radio base station and a mobile station, including the steps of: (A) notifying, from the radio base station to the mobile station, a discontinuous reception state parameter and a non-discontinuous reception state parameter; (B) determining, at the mobile station, a downlink synchronization state based on a radio quality of a serving cell for the mobile station; (C) determining, at the mobile station, whether or not the mobile station is in a radio link failure state, based on the downlink synchronization state, the discontinuous reception state parameter, and the non-discontinuous reception state parameter; and (D) re-establishing, at the mobile station, a connection with the radio base station, when the mobile station determines that the mobile station is in the radio link failure state; wherein in the step (C), the mobile station determines whether or not the mobile station is in the radio link failure state, based on the downlink synchronization state and the acquired discontinuous reception state parameter, when the mobile station is in the discontinuous reception state; and in the step (C), the mobile station determines whether or not the mobile station is in the radio link failure state, based on the downlink synchronization state and the acquired non-discontinuous reception state parameter, when the mobile station is not in the discontinuous reception state.

Effect of the Invention

As described above, according to the invention, it is possible to provide the mobile station, the radio base station, and the mobile communication method capable of appropriately determining the radio link failure state for both the discontinuous reception state and the non-discontinuous reception state.

BEST MODES FOR CARRYING OUT THE INVENTION (Configuration of Mobile Communication System According to First Embodiment of the Present Invention With reference to FIG. 1 to FIG. 7, the configuration of a mobile communication system according to a first embodiment of the present invention will be explained.

Figure 1:
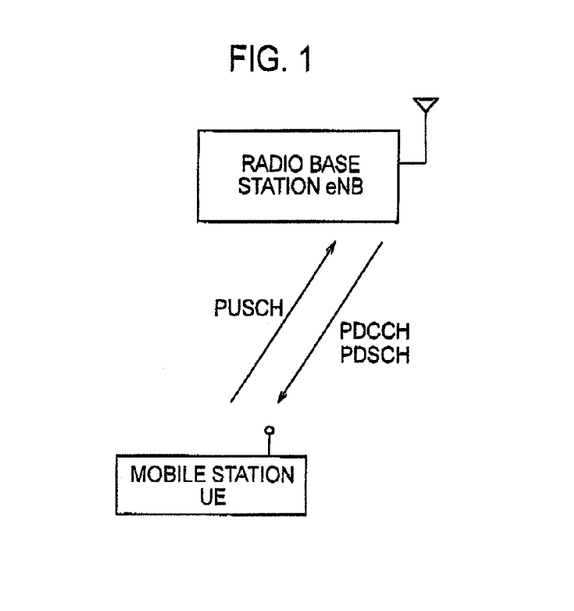
FIG. 1 is a diagram showing the entire configuration of a mobile communication system according to a first embodiment of the present invention.

As shown in FIG. 1, a mobile communication system according to the embodiment is a mobile communication system of the LTE scheme. In the mobile communication system of the LTE scheme, it is considered that, as a radio access scheme, an "OFDM (Orthogonal Frequency Division Multiplexing) scheme" is applied to a downlink and an "SC-FDMA (Single-Carrier Frequency Division Multiple Access) scheme" is applied to an uplink.

According to the OFDM scheme, a specific frequency band is divided into a plurality of narrow frequency bands (sub-carriers) and data is loaded on each frequency band and is transmitted. According to the OFDM scheme, the sub-carriers are densely arranged on the frequency axis without interference therebetween although a part of the sub-carriers overlap each other, so that high-rate transmission can be performed and frequency use efficiency can be improved.

The SC-FDMA scheme is a transmission scheme capable of reducing interference among a plurality of mobile stations UE, by dividing a specific frequency band and transmitting data using different frequency bands among the plurality of mobile stations UE. According to the SC-FDMA scheme, it is possible to achieve low power consumption and broad coverage of the mobile station UE because a variation in transmission power is small.

In the mobile communication system according to the embodiment, the mobile base station eNB is configured to transmit a downlink control signal via the physical downlink control channel (PDCCH) and transmit a downlink data signal via a physical downlink shared channel (PDSCH).

Furthermore, in the mobile communication system according to the embodiment, the mobile station UE is configured to transmit an uplink data signal via a physical uplink shared channel (PUSCH).

Figure 2:
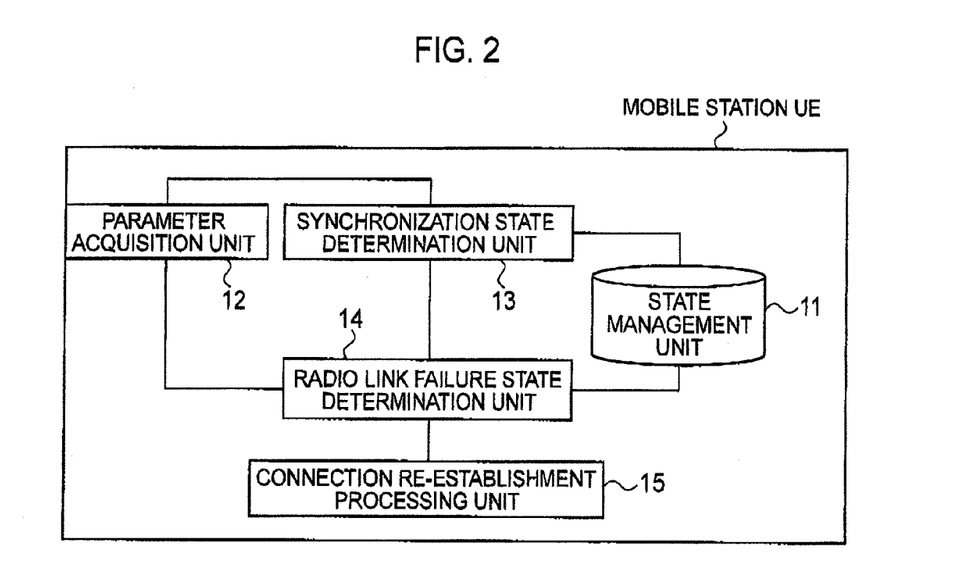
FIG. 2 is a functional block diagram of a mobile station according to the first embodiment of the present invention.

As shown in FIG. 2, the mobile station UE includes a state management unit 11, a parameter acquisition unit 12, a synchronization state determination unit 13, a radio link failure state determination unit 14, and a connection re-establishment processing unit 15.

The state management unit 11 is configured to manage whether or not the mobile station UE is in the discontinuous reception state. The state management unit 11 is configured to notify, to the synchronization state determination unit 13 and the radio link failure state determination unit 14, whether or not the mobile station UE is in the discontinuous reception state, that is, the mobile station UE is in the discontinuous reception state or the non-discontinuous reception state.

The fact that the mobile station UE is in the non-discontinuous reception state may represent that the mobile station UE is in an active state. For example, the active state is defined in the 3GPP TS36.321, V8.2.0, Chapter 5.7. In such a case, a non-active state corresponds to the discontinuous reception state.

Hereinafter, the definition of the active state will be described.

For example, the active state may include an ON duration of the discontinuous reception control, a time period during which a DRX inactivity timer is activated, and a time period during which DRX retransmission timer and a contention resolution timer are activated.

The active state may include a time period during which a scheduling request is pending. Alternatively, the active state may include a time period during which the mobile station does not receive the PDCCH having its own RNTI or a temporary RNTI and giving an instruction of new transmission once when an uplink scheduling grant for retransmission has occurred or after reception of a random access response succeeds.

Here, the "DRX retransmission timer" refers to a timer activated after the HARQ RTT timer activated after receiving newly transmitted packet data expires, and a timer which defines a time period interval at which the packet data is retransmitted.

In addition, the "contention resolution timer" refers to a timer which is activated from a timing at which the Message 3 is transmitted in a random access procedure and a timer which defines a time period interval at which contention resolution is performed by the Message 4.

In addition, the "scheduling request is pending" refers to a state until an uplink grant (uplink scheduling grant) is actually notified via the downlink after a scheduling request is transmitted via the uplink.

The definition of the active state may include all of the time periods described above or a part thereof. For example, the active state may indicate only a time period during which the DRX inactivity timer is activated.

The parameter acquisition unit 12 is configured to acquire a discontinuous reception state parameter and a non-discontinuous reception state parameter from the radio base station eNB. The parameter acquisition unit 12 is configured to notify, to the radio link failure state determination unit 14, the discontinuous reception state parameter and the non-discontinuous reception state parameter.

The radio link failure state determination unit 14 may be notified of the discontinuous reception state parameter and the non-discontinuous reception state parameter as a part of broadcast information or as a part of information of RRC signaling which is dedicatedly notified to each mobile station UE in a cell.

The synchronization state determination unit 13 is configured to measure the radio quality of a serving cell for the mobile station UE, and to determine the downlink synchronization state based on the radio quality. Here, the radio quality of the serving cell for the mobile station UE is the quality of the radio link between the radio base station eNB and the mobile station UE.

For example, the synchronization state determination unit 13 may be configured to measure the SIR of a signal (for example, a reference signal (RS)) from the serving cell for the mobile station UE, as the radio quality of the serving cell for the mobile station UE, and to determine the downlink synchronization state based on the measured SIR.

In more detail, the synchronization state determination unit 13 may be configured to determine that the downlink synchronization state is OK, that is, In-sync, when the SIR is larger than a predetermined threshold value, and to determine that the downlink synchronization state is NG, that is, Out-of-sync, when the SIR is equal to or less than the predetermined threshold value.

Figure 3:
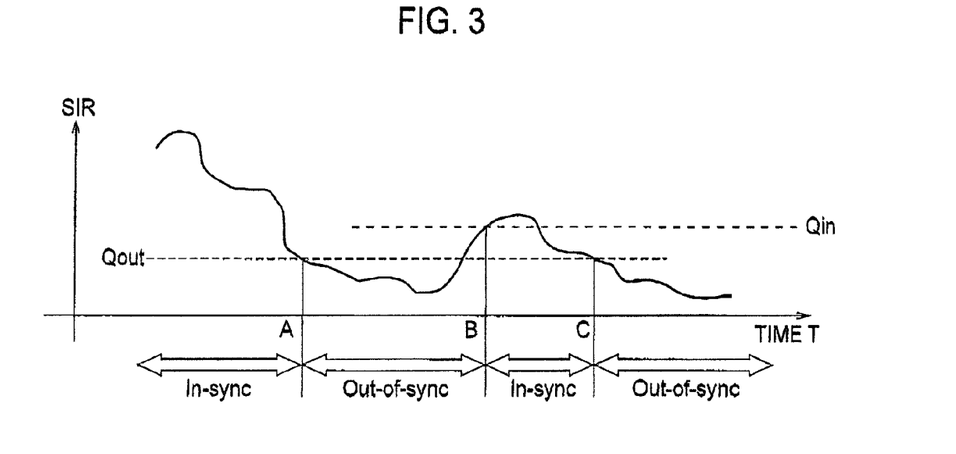
FIG. 3 is a diagram explaining how a synchronization state is determined by a synchronization state determination unit of the mobile station according to the first embodiment of the present invention.

Alternatively, as shown in FIG. 3, the synchronization state determination unit 13 may be configured to set two threshold values of Qout and Qin, and to determine the downlink synchronization state based on the above-described SIR, Qout, and Qin.

Here, a relationship of Qout<Qin is established and a difference between the Qin and the Qout, that is, "Qin−Qout", corresponds to hysteresis. That is, in the example of FIG. 3, the synchronization state determination unit 13 is configured to determine that the downlink synchronization state is In-sync, because the SIR is larger than the Qout when T<A, and to determine that the downlink synchronization state is Out-of-sync, because the SIR is equal to or less than the Qout when time T=A.

The synchronization state determination unit 13 is configured to determine that the downlink synchronization state is In-sync based on the fact that the SIR is larger than the Qin when time T=B, and then to determine that the downlink synchronization state is Out-of-sync based on the fact that the SIR is equal to or less than the Qout when time T=C.

As described above, the two threshold values are set, that is, the hysteresis of "Qin−Qout" is set, so that it is possible to reduce fluctuation in the determination of In-sync and Out-of-sync.

In the above-described example, neither In-sync nor Out-of-sync may be reported between Qin and Qout.

Moreover, the synchronization state determination unit 13 may be configured to use an average value obtained by averaging instantaneous SIRs in a predetermined average interval, as the value of the above-described SIR. Here, the predetermined average interval may be 160 ms, 200 ms, 20 ms, or other values.

The value of the SIR may be an average value in the entire system band in a frequency direction or may be an average value in a part of the system band. A part of the system band, for example, may be a band having a predetermined bandwidth positioned at the center of the system band, or a band in which a synchronization signal or a physical broadcast channel is transmitted.

Furthermore, the synchronization state determination unit 13 may be configured to determine the downlink synchronization state using the average SIR in the average interval of 160 ms, when the mobile station UE is in the non-discontinuous reception state, and to determine the downlink synchronization state using the SIR in an On-duration of the discontinuous reception control, when the mobile station UE is in the discontinuous reception state.

The SIR in the On-duration of the discontinuous reception control may be an instantaneous SIR in the On-duration, an average SIR in the On-duration, or an average SIR in the plurality of On-durations.

The synchronization state determination unit 13 is configured to notify, to the radio link failure state determination unit 14, the determination result (In-sync/Out-of-sync) of the above-described downlink synchronization state.

In addition, the synchronization state determination unit 13 may be configured to notify, to the radio link failure state determination unit 14, the determination result (In-sync/Out-of-sync) of the above-described downlink synchronization state every 10 ms. Here, 10 ms is for illustrative purposes only and values other than 10 ms may be employed.

Moreover, the synchronization state determination unit 13 may be configured to notify, to the radio link failure state determination unit 14, the determination result (In-sync/Out-of-sync) of the above-described downlink synchronization state every radio link frame.

Furthermore, the synchronization state determination unit 13 may be configured to notify, to the radio link failure state determination unit 14, the determination result of the downlink synchronization state every 10 ms, when the mobile station UE is in the non-discontinuous reception state, and to notify, to the radio link failure state determination unit 14, the determination result of the downlink synchronization state every DRX cycle, when the mobile station UE is in the discontinuous reception state.

Here, for example, the "notifying the determination result of the downlink synchronization state every DRX cycle" may represent "notifying of the determination result of the downlink synchronization state at the timing of the On-duration every DRX cycle".

In addition, the synchronization state determination unit 13 is configured to acquire information regarding whether or not the mobile station UE is in the discontinuous reception state, from the state management unit 11.

Furthermore, in the above-described example, the synchronization state determination unit 13 is configured to use the SIR of the reference signal, as the radio quality of the serving cell. However, instead of this, a reference signal received power (RSRP), a reference signal received quality (RSRQ), or a CQI may be used.

Instead of the SIR of the reference signal, the synchronization state determination unit 13 may be configured to use an error rate of the PDCCH, an error rate of a PCFICH, an SIR of the PCFICH, an error rate of the PDSCH, a symbol error rate of a DL RS and the like.

In the case of using the error rate of the PDCCH, an error rate of the physical downlink control channel may be calculated on the assumption of a specific value for a transmission power per a resource element, the format of the PDCCH, an aggregation level and the like.

Here, the aggregation level refers to a level for determining the number of resource elements or the number of symbols as a physical channel such as the PDCCH.

That is, by determining the aggregation level, the number of resource elements or the number of symbols as the physical channel such as the PDCCH is determined.

Furthermore, the format of the PDCCH may be called a DCI (Downlink Control Information) format.

In addition, the synchronization state determination unit 13 may be configured to use at least one of the SIR of the reference signal, the reference signal received power, the RSRQ, the CQI, the error rate of the PDCCH, the error rate of the PCFICH, the SIR of the PCFICH, the error rate of the PDSCH, and the symbol error rate of the DL RS, as the radio quality of the serving cell.

The RSRQ (Reference Signal Received Quality Power) is a value obtained by dividing the reference signal received power of the downlink by an RSSI (Received Signal Strength Indicator) of the downlink. Here, the RSSI refers to a total reception level observed for the mobile station and a reception level including all of thermal noise, an interference power from another cell, a power of a desired signal from an own cell, and the like (see the definition of the RSRQ described in the 3 GPP TS 36.214 and V 8.3.0). In addition, the CQI (Channel Quality Indicator) refers to radio quality information of the downlink (see the definition of the CQI described in the 3GPP TS 36.213 and V 8.3.0).

The radio link failure state determination unit 14 is configured to determine whether or not the mobile station UE is in the radio link failure state, based on the determination result of the downlink synchronization state by the above-described synchronization state determination unit 13 and the discontinuous reception state parameter and the non-discontinuous reception state parameter designated by the parameter acquisition unit 12.

For example, when the Out-of-sync is continuously reported N313 times by the synchronization state determination unit 13, the radio link failure state determination unit 14 is configured to activate a timer. When the timer expires, the radio link failure state determination unit 14 may be configured to determine that the mobile station UE is in the radio link failure state.

Figure 4:
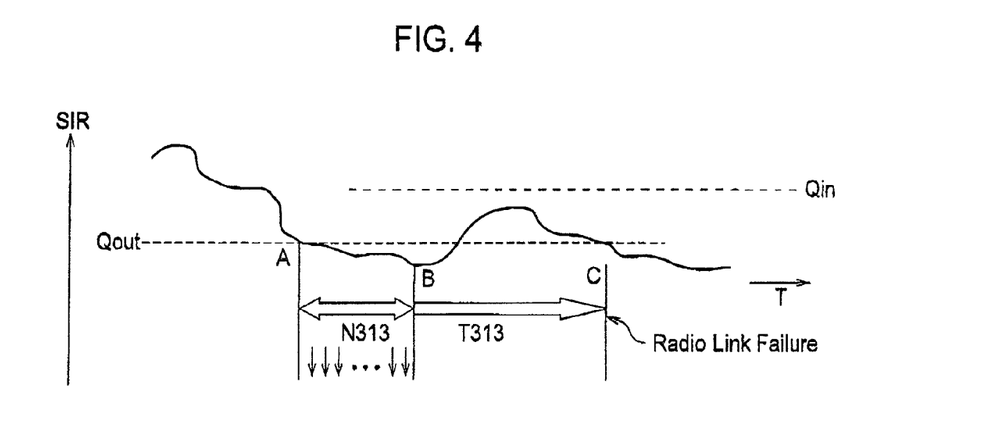
FIG. 4 is a diagram explaining how a radio link failure is determined by a radio link failure state determination unit of the mobile station according to the first embodiment of the present invention.

In more detail, as shown in FIG. 4, the radio link failure state determination unit 14 continuously receives a notification indicating the Out-of-sync as the downlink synchronization state N313 times from the synchronization state determination unit 13 from the time T=A to the time T=B.

In such a case, at the time T=B, the radio link failure state determination unit 14 is configured to activate the timer T313. Then, when the timer T313 expires (the time T=C), the radio link failure state determination unit 14 is configured to determine that the mobile station UE is in the radio link failure state.

Figure 5:
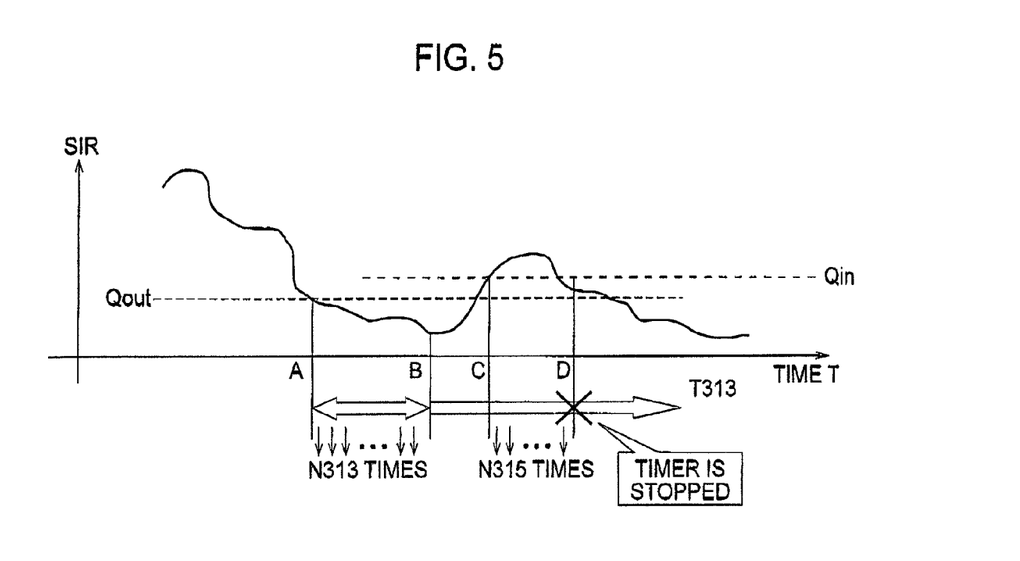
FIG. 5 is a diagram explaining how a radio link failure is determined by a radio link failure state determination unit of the mobile station according to the first embodiment of the present invention.

As shown in FIG. 5, while the timer T313 is activated, the radio link failure state determination unit 14 continuously receives a notification indicating the In-sync as the downlink synchronization state N315 times from the synchronization state determination unit 13 from the time T=C to the time T=D.

In such a case, at the time T=D, the radio link failure state determination unit 14 is configured to stop the timer T313. In such a case, since the timer T313 is stopped before the expiration, the radio link failure state determination unit 14 is configured to determine that the mobile station UE is not in the radio link failure state.

In addition, in the above-described example, N313 and N315 are the threshold values regarding the number of times by which the Out-of-sync or the In-sync is continuously notified. However, instead of this, N313 and N315 may be threshold values regarding a time period during which the Out-of-sync or the In-sync is continuously notified.

Figure 6:
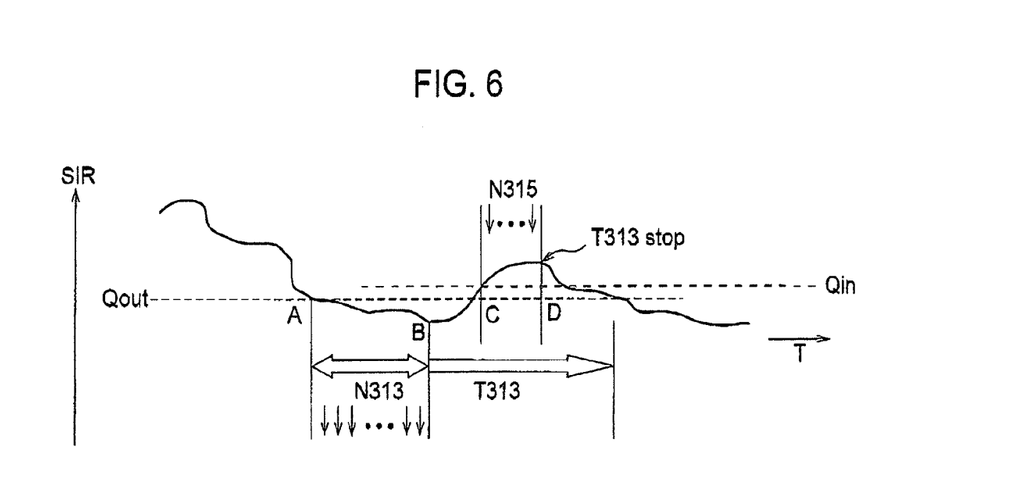
FIG. 6 is a diagram explaining how a radio link failure is determined by a radio link failure state determination unit of the mobile station according to the first embodiment of the present invention.

For example, as shown in FIG. 6, a time period (B−A) from the time T=A to the time T=B may correspond to "N313". When the Out-of-sync is continuously notified during the time period defined as "N313", that is, when only the Out-of-sync is notified, the radio link failure state determination unit 14 may activate the timer T313 at the time T=B.

For example, as shown in FIG. 6, the time period (D-C) from the time T=C to the time T=D may correspond to "N315". When the In-sync is continuously notified during the time period defined as "N315", that is, when only the In-sync is notified, the radio link failure state determination unit 14 may stop the timer T313 at the time T=D.

That is, the N313 and the N315 may be the number of times as a unit by which the synchronization state is notified from the synchronization state determination unit 13. Instead of this, the N313 and the N315 may be a time period at which the synchronization state is notified by the synchronization state determination unit 13.

Furthermore, in the above-described example, the three parameters "N313", "T313", and "N315" are defined in order to determine whether or not the mobile station UE is in the radio link failure state. However, instead of this, at least one of the three parameters "N313", "T313", and "N315" may be used as the parameter for determining whether or not the mobile station UE is in the radio link failure state.

Furthermore, the N313 may be called N310. Moreover, the T313 may be called T310. Also, the N315 may be called N311.

When determining that the mobile station UE is in the radio link failure state, the radio link failure determination unit 14 is configured to notify, to the connection re-establishment processing unit 15, the determination result.

In addition, the discontinuous reception state parameter and the non-discontinuous reception state parameter include "N313" which is the continuous Out-of-sync number for activating the above-described timer "T313", "T313" which is the timer value for determining whether the mobile station UE is in the radio link failure state, and "N315" which is the continuous In-sync number for stopping the timer, and the like.

Figure 7:
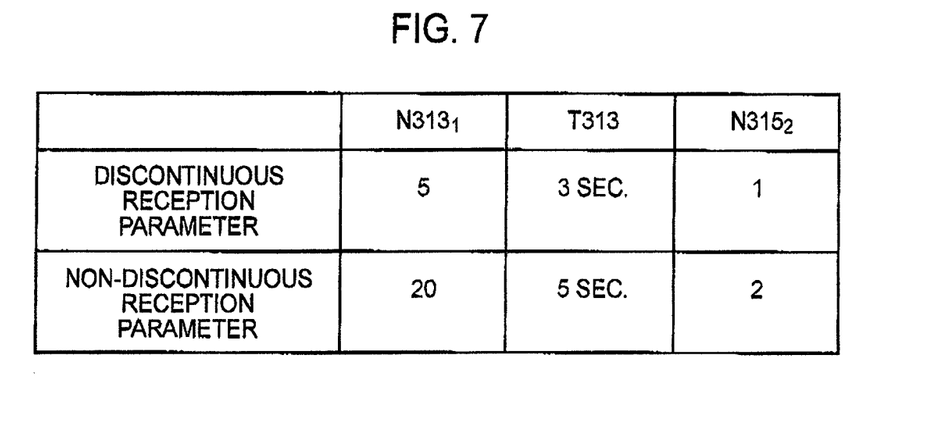
FIG. 7 is a diagram showing one example of a discontinuous reception parameter and a non-discontinuous reception parameter used in the mobile station according to the first embodiment of the present invention.

FIG. 7 is a diagram illustrating an example of the discontinuous reception state parameter ("N313", "T313", and "N315") and the non-discontinuous reception state parameter ("N313", "T313", and "N315").

As is apparent from the example, in the mobile communication system according to the embodiment, the value of the discontinuous reception state parameter is different from the value of the non-discontinuous reception state parameter.

For example, the value (N313) of a first parameter in the discontinuous reception state parameter may be configured to be smaller than the value (N313) of a first parameter in the non-discontinuous reception state parameter.

The following description will be given about the effect when the value (N313=5) of the first parameter in the discontinuous reception state parameter is set to be smaller than the value (N313=20) of the first parameter in the non-discontinuous reception state parameter.

In the discontinuous reception state, since the determination frequency for determining the downlink synchronization state is low as compared with in the non-discontinuous reception state, the interval between the determinations becomes larger.

In such a case, in order for the time period necessary for the determination to have an appropriate length, the value (N313=5) of the first parameter in the discontinuous reception state parameter has to be smaller than the value (N313=20) of the first parameter in the non-discontinuous reception state parameter.

Here, the appropriate length, for example, is a reflection time period necessary to determine that the mobile station UE is in the radio failure state, and preferably has a small value to a maximum extent if a determination can be performed with high accuracy.

That is, as described above, the value (N313=5) of the first parameter in the discontinuous reception state parameter is configured to be smaller than the value (N313=20) of the first parameter in the non-discontinuous reception state parameter, so that a determination that the mobile station UE is in the radio link failure state can be appropriately performed in the discontinuous reception state.

Meanwhile, the value (N313) of the first parameter in the discontinuous reception state parameter may be configured to be larger than the value (N313) of the first parameter in the non-discontinuous reception state parameter.

For example, the value (N313) of the first parameter in the discontinuous reception state parameter may be set to 10 and the value (N313) of the first parameter in the non-discontinuous reception state parameter may be set to 2.

The following description will be given about the effect when the value (N313=10) of the first parameter in the discontinuous reception state parameter is set to be larger than the value (N313=2) of the first parameter in the non-discontinuous reception state parameter.

In the discontinuous reception state, since the determination frequency for determining the downlink synchronization state is low as compared with in the non-discontinuous reception state, it is necessary to increase the number of samples. Here, the number of samples, for example, refers to the number of samples necessary when accurately determining that the mobile station UE is in the radio failure state.

Accordingly, as described above, the value (N313=10) of the first parameter in the discontinuous reception state parameter is configured to be larger than the value (N313=2) of the first parameter in the non-discontinuous reception state parameter, so that a determination that the mobile station UE is in the radio failure state can be appropriately performed in the discontinuous reception state.

In the same manner as this, the value (T313=3) of a second parameter in the discontinuous reception state parameter is configured to be smaller than the value (T313=5) of a second parameter in the non-discontinuous reception state parameter, so that a determination that the mobile station UE is in the radio link failure state can be performed in the discontinuous reception state in a reduced time period.

In addition, the value (T313) of the second parameter in the discontinuous reception state parameter is configured to be larger than the value (T313) of the second parameter in the non-discontinuous reception state parameter, so that a determination that the mobile station UE is in the radio failure state can be appropriately performed in the discontinuous reception state.

In the same manner as this, the value (N315=1) of a third parameter in the discontinuous reception state parameter is configured to be smaller than the value (N315=2) of a third parameter in the non-discontinuous reception state parameter, so that a determination whether or not the mobile station UE is in the radio failure state can be performed in the discontinuous reception state in a reduced time period.

In addition, the value (N315) of the third parameter in the discontinuous reception state parameter is configured to be larger than the value (N315) of the third parameter in the non-discontinuous reception state parameter, so that a determination whether or not the mobile station UE is in the radio failure state can be appropriately performed in the discontinuous reception state.

That is, when the mobile station UE is in the discontinuous reception state, the radio link failure state determination unit 14 determines whether or not the mobile station UE is in the radio link failure state, based on the downlink synchronization state determined by the synchronization state determination unit 13 and the discontinuous reception state parameter acquired by the parameter acquisition unit 12.

On the other hand, when the mobile station UE is not in the discontinuous reception state, the radio link failure state determination unit 14 determines whether or not the mobile station UE is in the radio link failure state, based on the downlink synchronization state determined by the synchronization state determination unit 13 and the non-discontinuous reception state parameter acquired by the parameter acquisition unit 12.

When the determination result indicating the mobile station UE is in the radio link failure state is notified from the radio link failure state determination unit 14, the connection re-establishment processing unit 15 is configured to perform connection re-establishment processing. Moreover, the connection re-establishment processing unit 15 may be configured to clear the configuration of the communication between the mobile station UE and the radio base station eNB, before performing the connection re-establishment processing.

In addition, the connection re-establishment processing may be called, for example, "Cell Update processing". Furthermore, the "Cell Update processing", for example, refers to processing in which a cell is searched, the radio quality of the searched cell is measured, and a connection is re-established with respect to the cell when there is a communicable cell. In addition, the "Cell Update processing" may be called "Connection Re-establishment processing".

Furthermore, the mobile station may perform the above-described connection re-establishment processing, when there is no processing being performed or when an operation in the radio link failure state is not defined in the processing being performed. In such a case, the mobile station may perform the operation in the radio link failure state during the processing being performed, when there is processing being performed and when the operation in the radio link failure state is defined in the processing being performed.

Figure 8:
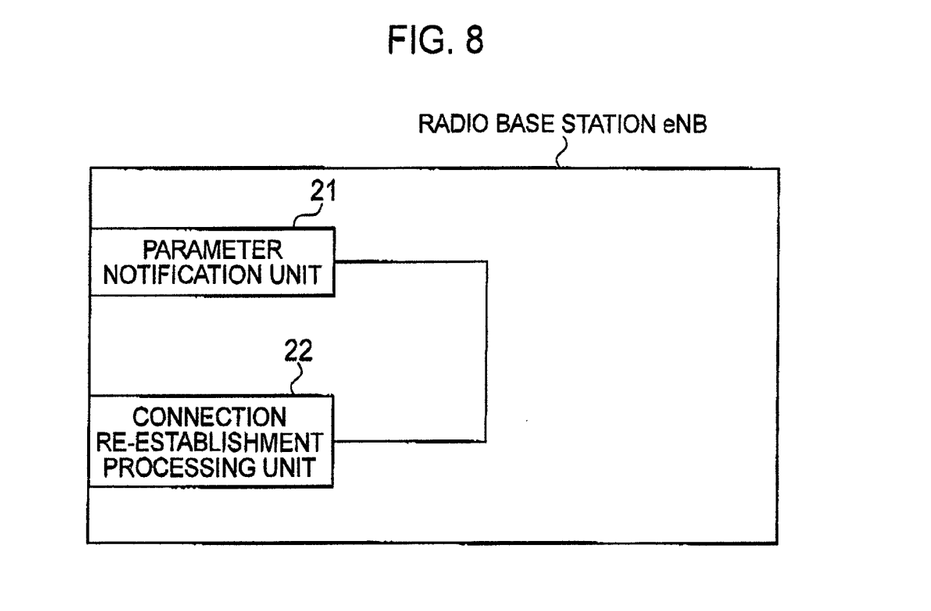
FIG. 8 is a functional block diagram of a radio base station according to the first embodiment of the present invention.

As shown in FIG. 8, the radio base station eNB includes a parameter notification unit 21 and a connection re-establishment processing unit 22.

The parameter notification unit 21 is configured to notify, to the mobile station UE, the discontinuous reception state parameter and the non-discontinuous reception state parameter described above.

In detail, the parameter notification unit 21 is configured to notify, to the mobile station UE, the discontinuous reception state parameter and the non-discontinuous reception state parameter via the physical downlink shared channel (PD-SCH).

In addition, the mobile station UE may be notified of the discontinuous reception state parameter and the non-discontinuous reception state parameter as a part of the broadcast information, or as a part of the information in a dedicated control signal and an RRC message.

The connection re-establishment processing unit 22 performs connection re-establishment processing, when the mobile station UE performs the above-described connection re-establishment processing, and notifies, to the connection re-establishment processing unit 22, connection re-establishment signaling. That is, the connection re-establishment processing unit 22 performs the processing of re-establishing a connection with the mobile station UE.

(Operation of the Mobile Communication System According to the First Embodiment of the Present Invention)

Figure 9:
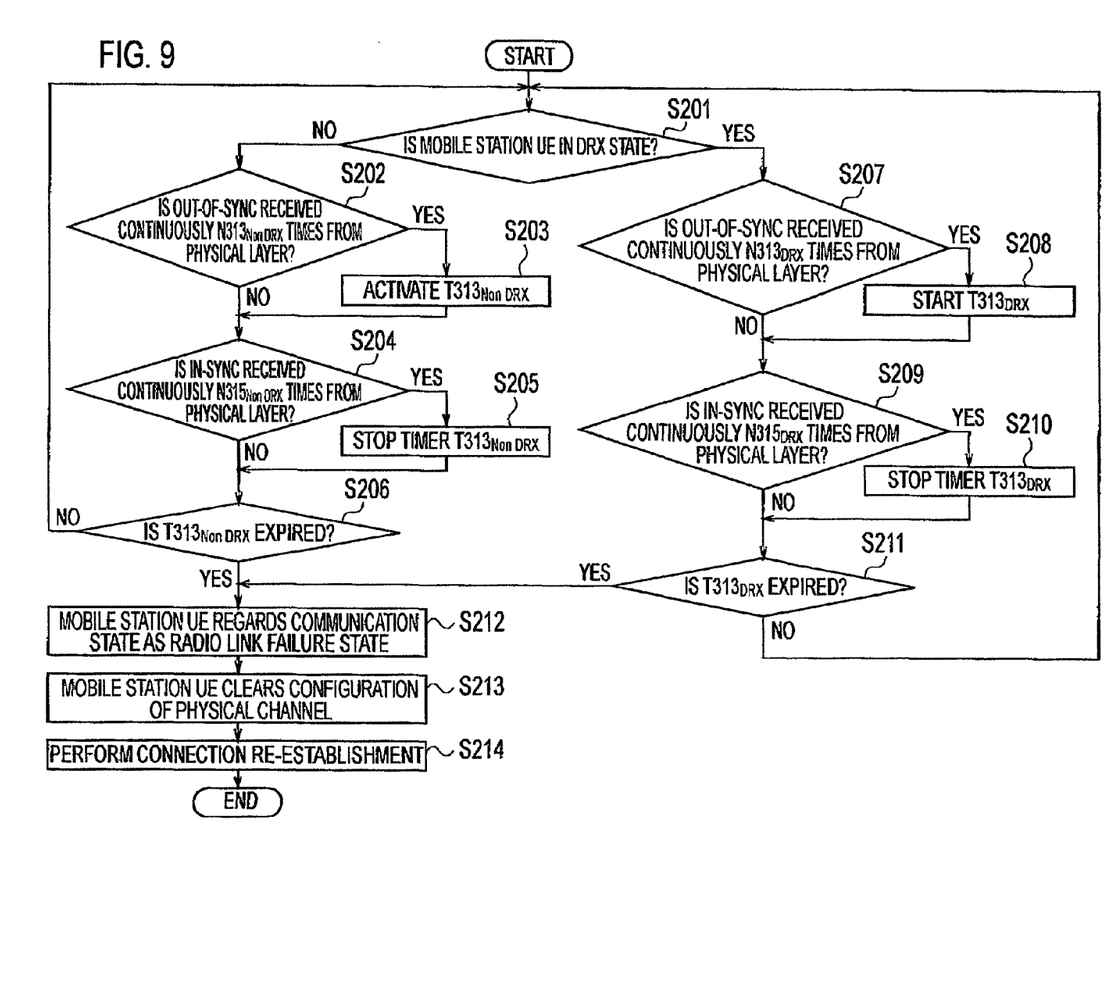
FIG. 9 is a flowchart illustrating an operation of the mobile station according to the first embodiment of the present invention.

With reference to FIG. 9, the operation of the mobile communication system according to the first embodiment of the present invention will be explained.

In step S201, the mobile station UE determines whether or not the mobile station UE is in the discontinuous reception state (DRX state). When the mobile station UE is not in the discontinuous reception state (DRX state), the process proceeds to step S202. When the mobile station UE is in the discontinuous reception state (DRX state), the process proceeds to step S207.

When the mobile station UE continuously receives the report of the "Out-of-sync", that is, the "synchronization state: NG" $N313_{Non\_DRX}$ (which is a first parameter in the non-discontinuous reception state parameter) times from the physical layer in step S202 (YES in step S202), the mobile station UE activates a timer $T313_{Non\_DRX}$ (S203). In addition, steps S202 and S204 may be performed only when a timer $T313_{Non\_DRX}$ (which is a second parameter in the non-discontinuous reception state parameter) is not activated.

On the other hand, when the mobile station UE continuously receives the report of the "In-sync", that is, the "synchronization state: OK" $N315_{Non\_DRX}$ (which is a third parameter in the non-discontinuous reception state parameter) times from the physical layer in step S204 (YES in step S204), the mobile station UE stops the timer $T313_{Non\_DRX}$ (S205). In addition, steps S204 and S205 may be performed only when the timer $T313_{Non\_DRX}$ is activated.

Then, when the $T313_{Non\_DRX}$ expires (YES in step S206), the process proceeds to step S212. When the $T313_{Non\_DRX}$ does not expire (NO in step S206), the process returns to step S201. In addition, step S206 may be performed both when the $T313_{Non\_DRX}$ is activated and when the $T313_{Non\_DRX}$ is not activated.

On the other hand, when the mobile station UE continuously receives the report of the "Out-of-sync", that is, the "synchronization state: NG" $N313_{DRX}$ (which is a first parameter in the discontinuous reception state parameter) times from the physical layer in step S207 (YES in step S207), the mobile station UE activates a timer $T313_{DRX}$ (S208). In addition, steps S207 and S208 may be performed only when a timer $T313_{DRX}$ (which is a second parameter in the discontinuous reception state parameter) is not activated.

On the other hand, when the mobile station UE continuously receives the report of the "In-sync", that is, the "synchronization state: OK" $N315_{DRX}$ (which is a third parameter in the discontinuous reception state parameter) times from the physical layer in step S209 (YES in step S209), the mobile station UE stops the timer $T313_{DRX}$ (S210). In addition, steps S209 and S210 may be performed only when the timer $T313_{DRX}$ is activated.

Then, when the $T313_{DRX}$ expires (YES in step S211), the process proceeds to step S212. When the $T313_{DRX}$ does not expire (NO in step S211), the process returns to step S201. In addition, step S211 may be performed both when the $T313_{DRX}$ is activated and when the $T313_{DRX}$ is not activated.

In step S212, the mobile station UE regards the communication state between the radio base station eNB and the mobile station UE as the radio link failure state.

In step S213, the mobile station UE clears the configuration of the communication with the radio base station eNB.

In step S214, the mobile station UE performs the connection re-establishment processing.

(Operation and Effect of the Mobile Communication System According to the First Embodiment of the Present Invention)

In the mobile communication system according to the first embodiment of the invention, it is possible to change the values of the discontinuous reception state parameter and the non-discontinuous reception state parameter according to whether or not the mobile station is in the DRX state, so that the mobile station UE can determine whether or not the mobile station UE is in the radio link failure state at an appropriate timing and with high accuracy, the communication quality can be stabilized, re-establishment of communication can be quickly achieved, and user convenience can be improved.

(First Modification)

Figure 10:
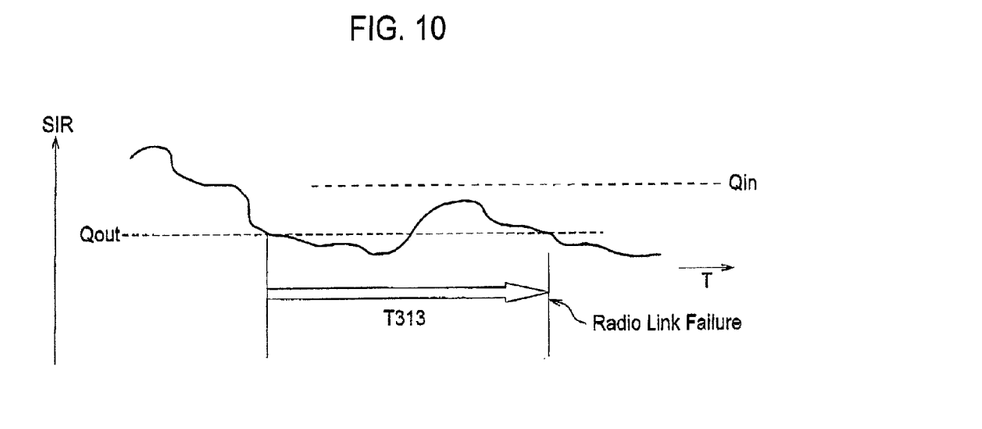
FIG. 10 is a diagram explaining how a radio link failure is determined by a radio link failure state determination unit of the mobile station according to a first modification of the present invention.
Figure 11:
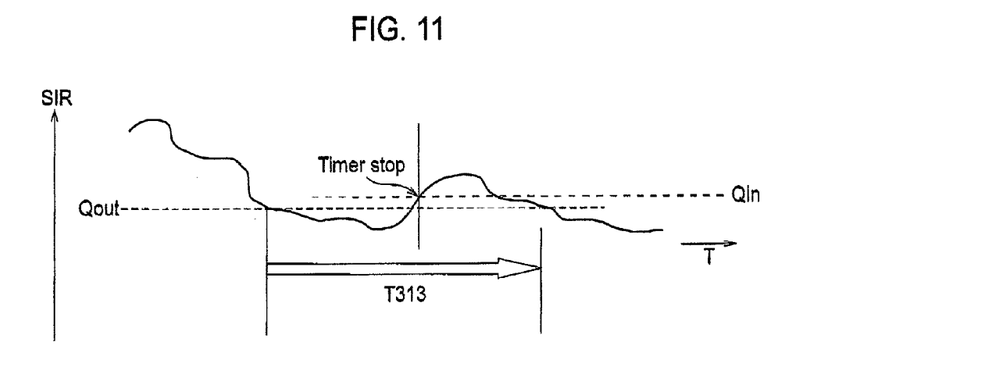
FIG. 11 is a diagram explaining how a radio link failure is determined by the radio link failure state determination unit of the mobile station according to the first modification of the present invention.

According to the first modified example of the invention, it is assumed "N313=1" and "N315=1" in the above examples (FIGS. 4 and 5), as shown in FIGS. 10 and 11.

The second parameter "T313" in the discontinuous reception state parameter may be set to be the same as the second parameter "T313" in the non-discontinuous reception state parameter. In addition, the second parameter "T313" in the discontinuous reception state parameter may be set to be the different from the second parameter "T313" in the non-discontinuous reception state parameter.

According to the former, since there are no "N313" and "N315", a simpler structure can be achieved. Since it is controlled by the time period, appropriate control can be performed when it is considered that the time period necessary for determining that the mobile station UE is in the radio link failure state is the same in the discontinuous reception state and the non-discontinuous reception state to control the time.

According to the latter, since there are no "N313" and "N315", a simpler structure can be achieved. Therefore, it is possible to set the value of the discontinuous reception state separately from the value of the non-discontinuous reception state at "T313" from the viewpoint of the fact that "since there is no data to be communicated in the discontinuous reception state, the radio link failure state has to be determined accurately although it takes some time period, whereas since there is data to be communicated in the non-discontinuous reception state, the radio link failure state can be determined quickly although the accuracy becomes poor to some extent to perform the connection re-establishment processing".

(Second Modification)

Figure 12:
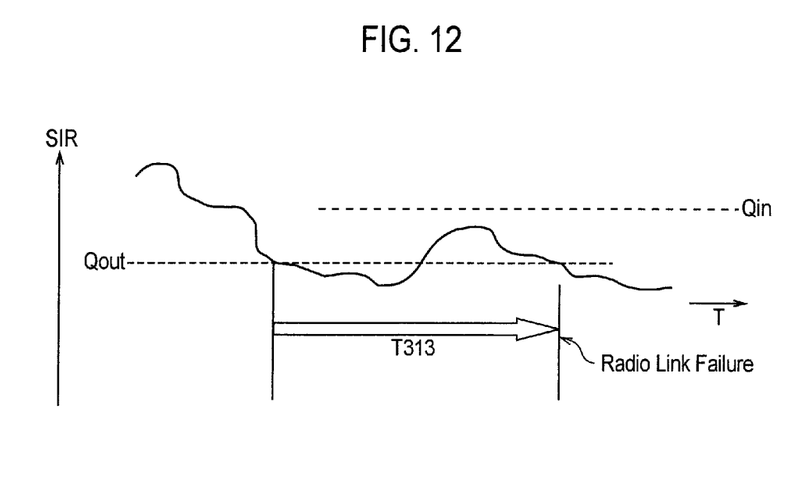
FIG. 12 is a diagram explaining how a radio link failure is determined by the radio link failure state determination unit of the mobile station according to a second modification of the present invention.
Figure 13:
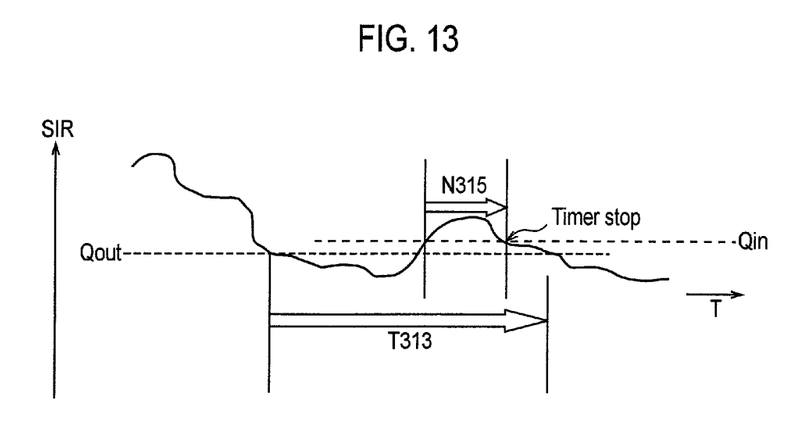
FIG. 13 is a diagram explaining how the radio link failure is determined by the radio link failure state determination unit of the mobile station according to the second modification of the present invention.

According to the second modified example of the invention, it is assumed that "N313=1" in the above examples (FIGS. 4 and 5), as shown in FIGS. 12 and 13.

In the second modified example, "N315" is defined by a time period instead of the number of times.

Here, the first parameter "T313" and the second parameter "N315" in the discontinuous reception state parameter may be the same as the first parameter "T313" and the second parameter "N315" in the non-discontinuous reception state parameter, respectively. Alternatively, the first parameter "T313" and the second parameter "N315" in the discontinuous reception state parameter may be different from the first parameter "T313" and the second parameter "N315" in the non-discontinuous reception state parameter, respectively.

According to the former, since there is no "N313", a simpler structure can be achieved. Since it is controlled by the time period, appropriate control can be performed when it is considered that the time period necessary for determining that the mobile station UE is in the radio link failure state is the same in the discontinuous reception state and the non-discontinuous reception state to control the time.

According to the latter, since there is no "N313", a simpler structure can be achieved. Therefore, it is possible to set the value of the discontinuous reception state separately from the value of the non-discontinuous reception state at "T313" and "N315" from the viewpoint of the fact that since "there is no data to be communicated in the discontinuous reception state, the radio link failure state can be determined accurately although it takes some time period, whereas since there is data to be communicated in the non-discontinuous reception state, the radio link failure state can be determined quickly although the accuracy becomes poor to some extent to perform the connection re-establishment processing".

(Third Modification)

In the second modified example described above, "N315" is defined by the time period instead of the number of times.

However, in the third modified example, "N315" may be defined by the number of times.

In the above-described first embodiment, there are two types of states, that is, the discontinuous reception state and the non-discontinuous reception state. However, even when there are three types of states, that is, a long discontinuous reception state, a short discontinuous reception state, and a non-discontinuous reception state, the mobile station, the radio base station, and the mobile communication method according to the invention can be applied thereto.

For example, when there are three types of states, that is, the long discontinuous reception state, the short discontinuous reception state, and the non-discontinuous reception state, three types of long discontinuous reception state parameter, short discontinuous reception state parameter, and non-discontinuous reception state parameter may be defined as the first parameter and the second parameter. In respective states, respective parameters may be applied thereto.

Furthermore, when there are three types of states, that is, the long discontinuous reception state, the short discontinuous reception state, and the non-discontinuous reception state, two types of discontinuous reception state parameter and non-discontinuous reception state parameter may be defined, the discontinuous reception state parameter may be applied to the long discontinuous reception state and the short discontinuous reception state, and the non-discontinuous reception parameter may be applied to the non-discontinuous reception state.

In addition, when there are three types of states, that is, the long discontinuous reception state, the short discontinuous reception state, and the non-discontinuous reception state, two types of long discontinuous reception state parameter and non-discontinuous reception state parameter may be defined, the long discontinuous reception state parameter may be applied to the long discontinuous reception state, and the non-discontinuous reception parameter may be applied to the short discontinuous reception state and the non-discontinuous reception state.

The operation of the above-described radio base station eNB or the mobile station UE may be implemented by a hardware, may also be implemented by a software module executed by a processor, and may further be implemented by the combination of the both.

The software module may be arranged in a storing medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

Such a storing medium is connected to the processor so that the processor can write and read information into and from the storing medium. Such a storing medium may also be accumulated in the processor. Such a storing medium and processor may be arranged in ASIC. Such ASIC may be arranged in the radio base station eNB or the mobile station UE. As a discrete component, such a storing medium and processor may be arranged in the radio base station eNB or the mobile station UE.

Thus, the present invention has been explained in detail by using the above-described embodiments; however, it is obvious that for persons skilled in the art, the present invention is not limited to the embodiments explained herein. The present invention can be implemented as a corrected, modified mode without departing from the gist and the scope of the present invention defined by the claims. Therefore, the description of the specification is intended for explaining the example only and does not impose any limited meaning to the present invention.

The invention claimed is:

1. A mobile station communicating with a radio base station, comprising:
    a parameter acquisition unit configured to acquire a discontinuous reception state parameter and a non-discontinuous reception state parameter from the radio base station;
    a synchronization state determination unit configured to determine a downlink synchronization state, based on a radio quality of a serving cell for the mobile station;
    a radio link failure state determination unit configured to determine whether or not the mobile station is in a radio link failure state, based on a determination result by the synchronization state determination unit; and
    a connection re-establishment unit configured to re-establish a connection with the radio base station, when the radio link failure state determination unit determines that the mobile station is in the radio link failure state, wherein
    the radio link failure state determination unit determines whether or not the mobile station is in the radio link failure state, based on the downlink synchronization state determined by the synchronization state determination unit and the discontinuous reception state parameter acquired by the parameter acquisition unit, when the mobile station is in a discontinuous reception state; and
    the radio link failure state determination unit determines whether or not the mobile station is in the radio link failure state, based on the downlink synchronization state determined by the synchronization state determination unit and the non-discontinuous reception state parameter acquired by the parameter acquisition unit, when the mobile station is not in the discontinuous reception state, wherein the discontinuous reception state includes reception states for receiving signals and non-reception states for not receiving signals that are set alternately and repeatedly.

2. The mobile station according to claim 1, wherein the radio link failure state determination unit is configured to activate a timer, when an asynchronous state of the downlink synchronization state continues for a first predetermined period or more, and to determine that the mobile station is in the radio link failure state at a time at which the timer expires; and the discontinuous reception state parameter and the non-discontinuous reception state parameter include at least one of a first parameter for defining the first predetermined period and a second parameter for defining the timer.

3. The mobile station according to claim 2, wherein the radio link failure state determination unit is configured to stop the timer, when the synchronous state of the downlink synchronization state continues for a second predetermined period or more in a state where the timer activates; and the discontinuous reception state parameter and the non-discontinuous reception state parameter include a third parameter for defining the second predetermined period.

4. A radio base station communicating with a mobile station, comprising:

a parameter notification unit configured to notify, to the mobile station, a discontinuous reception state parameter and a non-discontinuous reception state parameter; wherein the mobile station determines whether or not the mobile station in a discontinuous reception state is in a radio link failure state based on the discontinuous reception state parameter and a downlink synchronization state; and the mobile station determines whether or not the mobile station in a non-discontinuous reception state is in the radio link failure state based on the non-discontinuous reception state parameter and the downlink synchronization state, wherein the discontinuous reception state includes reception states for receiving signals and non-reception states for not receiving signals that are set alternately and repeatedly.

5. The radio base station according to claim 4, wherein a timer is configured to be activated in the mobile station, when an asynchronous state of the downlink synchronization state continues for a first predetermined period or more, and the mobile station determines that the mobile station is in the radio link failure state at a time at which the timer expires; and the discontinuous reception state parameter and the non-discontinuous reception state parameter include at least one of a first parameter for defining the first predetermined period and a second parameter for defining the timer.

6. The radio base station according to claim 5, wherein the timer is configured to be stopped in the mobile station, when the synchronous state of the downlink synchronization state continues for a second predetermined period or more in a state where the timer activates; and the discontinuous reception state parameter and the non-discontinuous reception state parameter include a third parameter for defining the second predetermined period.

7. A mobile communication method of performing communication between a radio base station and a mobile station, comprising the steps of:

(A) notifying, from the radio base station to the mobile station, a discontinuous reception state parameter and a non-discontinuous reception state parameter;

(B) determining, at the mobile station, a downlink synchronization state based on a radio quality of a serving cell for the mobile station;

(C) determining, at the mobile station, whether or not the mobile station is in a radio link failure state, based on the downlink synchronization state, the discontinuous reception state parameter, and the non-discontinuous reception state parameter; and (D) re-establishing, at the mobile station, a connection with the radio base station, when the mobile station determines that the mobile station is in the radio link failure state; wherein in the step (C), the mobile station determines whether or not the mobile station is in the radio link failure state, based on the downlink synchronization state and the acquired discontinuous reception state parameter, when the mobile station is in the discontinuous reception state; and in the step (C), the mobile station determines whether or not the mobile station is in the radio link failure state, based on the downlink synchronization state and the acquired non-discontinuous reception state parameter, when the mobile station is not in the discontinuous reception state, wherein the discontinuous reception state includes reception states for receiving signals and non-reception states for not receiving signals that are set alternately and repeatedly.

* * * * *